(12) United States Patent
Wong et al.

(10) Patent No.: US 10,520,686 B2
(45) Date of Patent: Dec. 31, 2019

(54) OPTICAL CONNECTOR WITH ONE-PIECE BODY

(71) Applicant: SENKO Advanced Components, Inc., Marlborough, MA (US)

(72) Inventors: Yim Wong, Hong Kong (HK); Man Ming Ho, Hong Kong (HK); Kazuyoshi Takano, Marlborough, MA (US)

(*) Notice: Subject to any disclaimer, the term of this patent is extended or adjusted under 35 U.S.C. 154(b) by 0 days.

(21) Appl. No.: 15/979,483

(22) Filed: May 15, 2018

(65) Prior Publication Data
US 2018/0335581 A1  Nov. 22, 2018

Related U.S. Application Data

(60) Provisional application No. 62/508,390, filed on May 18, 2017.

(51) Int. Cl.
 *G02B 6/38* (2006.01)
(52) U.S. Cl.
 CPC ........... *G02B 6/3893* (2013.01); *G02B 6/381* (2013.01); *G02B 6/387* (2013.01); *G02B 6/3821* (2013.01);
 (Continued)
(58) Field of Classification Search
 CPC .... G02B 6/381; G02B 6/3821; G02B 6/3825; G02B 6/3833; G02B 6/3851;
 (Continued)

(56) References Cited

U.S. PATENT DOCUMENTS 4,150,790 A  4/1979 Potter
4,327,964 A  5/1982 Haesly et al.
(Continued)

FOREIGN PATENT DOCUMENTS

CA  2495693 A1  4/2004
CN  2836038 Y  11/2006
(Continued)

OTHER PUBLICATIONS

ARK Communication Co., Ltd., SC/LC/FC/ST/MU/D4/DIN Fiber Optic Connectors, Oct. 21, 2014, Shenzhen, China, https://web.archive.org/web/20141021222819/http://www.ark-opitical.com/product-1-1-optic-fiber-connector-en/14296.
(Continued)

*Primary Examiner* — Daniel Petkovsek
(74) *Attorney, Agent, or Firm* — Edward S. Jarmolowicz, Esq.

(57) ABSTRACT

A multiple fiber push-on (MPO) optical connector is provided having a ferrule configured to house multiple optical fibers and including a stepped portion extending from at least one pair of opposing exterior surfaces of the ferrule. A one-piece housing-backpost is provided having a distal end in a connection direction and a proximal end in a cable direction. The one-piece housing-backpost is configured to receive a ferrule spring and the ferrule from the distal end. The housing-backpost includes at least one resiliently-deformable ferrule-retaining protrusion extending from a sidewall to engage a corresponding stepped portion of the ferrule. The resiliently-deformable ferrule-retaining protrusion is configured to deform towards the housing-backpost interior sidewall as the ferrule is inserted from the distal end and to extend outward against the stepped portion of the ferrule when the ferrule is seated in the housing-backpost to maintain the ferrule in the housing-backpost.

12 Claims, 23 Drawing Sheets

(52) U.S. Cl.
CPC ......... *G02B 6/3825* (2013.01); *G02B 6/3833* (2013.01); *G02B 6/3869* (2013.01); *G02B 6/3885* (2013.01); *G02B 6/3887* (2013.01); *G02B 6/3851* (2013.01); *G02B 6/3882* (2013.01)

(58) Field of Classification Search
CPC .... G02B 6/3869; G02B 6/387; G02B 6/3882; G02B 6/3885; G02B 6/3887; G02B 6/3893
See application file for complete search history.

(56) References Cited

U.S. PATENT DOCUMENTS

| | | |
|---|---|---|
| 4,478,473 A | 10/1984 | Frear |
| 4,762,388 A | 8/1988 | Tanaka et al. |
| 4,764,129 A | 8/1988 | Jones et al. |
| 4,840,451 A | 6/1989 | Sampson et al. |
| 4,844,570 A | 7/1989 | Tanabe |
| 4,872,736 A | 10/1989 | Myers et al. |
| 4,979,792 A | 12/1990 | Weber et al. |
| 5,041,025 A | 8/1991 | Haitmanek |
| 5,074,637 A | 12/1991 | Rink |
| D323,143 S | 1/1992 | Ohkura et al. |
| 5,212,752 A | 5/1993 | Stephenson et al. |
| 5,265,181 A | 11/1993 | Chang |
| 5,280,552 A | 1/1994 | Yokoi et al. |
| 5,289,554 A | 2/1994 | Cubukclyan et al. |
| 5,317,663 A | 5/1994 | Beard et al. |
| 5,335,301 A | 8/1994 | Newman et al. |
| 5,348,487 A | 9/1994 | Marazzi et al. |
| 5,444,806 A | 8/1995 | de Marchi et al. |
| 5,481,634 A | 1/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,781,681 A | 7/1998 | Manning |
| 5,915,056 A | 6/1999 | Bradley et al. |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,134,370 A | 10/2000 | Childers et al. |
| 6,178,283 B1 | 1/2001 | Weigel |
| 6,186,670 B1 | 2/2001 | Austin et al. |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,347,888 B1 | 2/2002 | Puetz |
| 6,461,054 B1 | 10/2002 | Iwase |
| 6,471,412 B1 | 10/2002 | Belenkiy |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,785,460 B2 | 8/2004 | de Jong et al. |
| 6,796,721 B2 * | 9/2004 | Matsumoto .......... G02B 6/3885 385/56 |
| 6,817,780 B2 | 11/2004 | Ngo |
| 6,854,894 B1 | 2/2005 | Yunker et al. |
| 6,872,039 B2 | 3/2005 | Baus et al. |
| 6,935,789 B2 | 8/2005 | Gross, III et al. |
| 6,984,074 B2 | 1/2006 | Makhlin et al. |
| 7,020,376 B1 | 3/2006 | Dang et al. |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,241,056 B1 | 7/2007 | Kuffel et al. |
| 7,258,493 B2 | 8/2007 | Milette |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmel et al. |
| D572,661 S | 6/2008 | En Lin et al. |
| 7,387,447 B2 | 6/2008 | Mudd et al. |
| 7,390,203 B2 | 6/2008 | Murano et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,510,335 B1 | 3/2009 | Su et al. |
| 7,513,695 B1 | 4/2009 | Lin et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,654,748 B2 | 2/2010 | Kuffel et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| D641,708 S | 7/2011 | Yamauchi |
| 8,186,890 B2 | 5/2012 | Lu |
| 8,192,091 B2 | 6/2012 | Hsu et al. |
| 8,202,009 B2 | 6/2012 | Lin et al. |
| 8,224,146 B2 | 7/2012 | Hackett |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,556,520 B2 | 10/2013 | Elenbaas et al. |
| 8,636,424 B2 | 1/2014 | Kuffel et al. |
| 8,636,425 B2 | 1/2014 | Nhep |
| 8,651,749 B2 | 2/2014 | Dainese Júnior et al. |
| 8,770,863 B2 | 7/2014 | Cooke et al. |
| 8,855,458 B2 | 10/2014 | Belenkiy et al. |
| 8,992,098 B2 * | 3/2015 | Anderson ............ G02B 6/3885 385/87 |
| 9,239,437 B2 | 1/2016 | Belenkiy et al. |
| 9,618,702 B2 | 4/2017 | Takano et al. |
| 9,618,703 B2 | 4/2017 | Iizumi et al. |
| 9,658,409 B2 | 5/2017 | Gniadek et al. |
| 9,778,425 B2 | 10/2017 | Nguyen et al. |
| 9,798,094 B2 | 10/2017 | Kuffel et al. |
| 9,897,766 B2 | 2/2018 | Gniadek et al. |
| 9,939,589 B2 | 4/2018 | Takano et al. |
| 9,977,199 B2 | 5/2018 | Chang et al. |
| 10,114,179 B2 | 10/2018 | Kamada et al. |
| 10,241,281 B2 * | 3/2019 | Otomitsu ................. G02B 6/40 |
| 2001/0010741 A1 | 8/2001 | Hizuka |
| 2003/0007739 A1 | 1/2003 | Perry et al. |
| 2003/0053787 A1 | 3/2003 | Lee |
| 2003/0063867 A1 | 4/2003 | McDonald et al. |
| 2003/0095754 A1 | 5/2003 | Matsumoto et al. |
| 2003/0147598 A1 | 8/2003 | McPhee et al. |
| 2003/0161586 A1 | 8/2003 | Hirabayashi |
| 2004/0047566 A1 | 3/2004 | McDonald et al. |
| 2004/0052473 A1 | 3/2004 | Seo et al. |

(56) References Cited

U.S. PATENT DOCUMENTS

| | | |
|---|---|---|
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2004/0264873 A1 | 12/2004 | Smith et al. |
| 2005/0111796 A1 | 5/2005 | Matasek et al. |
| 2005/0141817 A1 | 6/2005 | Yazaki et al. |
| 2005/0213897 A1 | 9/2005 | Palmer et al. |
| 2006/0089049 A1 | 4/2006 | Sedor |
| 2006/0127025 A1 | 6/2006 | Haberman |
| 2006/0269194 A1 | 11/2006 | Luther |
| 2006/0274411 A1 | 12/2006 | Yamauchi |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0026647 A1 | 1/2008 | Boehnlein et al. |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | En Lin |
| 2009/0022457 A1 | 1/2009 | de Jong et al. |
| 2009/0028507 A1 | 1/2009 | Jones et al. |
| 2009/0148101 A1 | 6/2009 | Lu et al. |
| 2009/0196555 A1 | 8/2009 | Lin et al. |
| 2009/0214162 A1 | 8/2009 | O'Riorden et al. |
| 2009/0220197 A1 | 9/2009 | Gniadek et al. |
| 2009/0226140 A1 | 9/2009 | Belenkiy et al. |
| 2009/0269014 A1 | 10/2009 | Winberg et al. |
| 2010/0034502 A1 | 2/2010 | Lu et al. |
| 2010/0092136 A1 | 4/2010 | Nhep |
| 2010/0215322 A1 | 8/2010 | Matsumoto et al. |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0177710 A1 | 7/2011 | Tobey |
| 2012/0099822 A1 | 4/2012 | Kuffel et al. |
| 2012/0189260 A1 | 7/2012 | Kowalczyk et al. |
| 2012/0269485 A1 | 10/2012 | Haley et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0183012 A1 | 7/2013 | Cabanne Lopez et al. |
| 2013/0216185 A1 | 8/2013 | Klavuhn et al. |
| 2013/0322825 A1 | 12/2013 | Cooke et al. |
| 2014/0016901 A1 | 1/2014 | Lambourn et al. |
| 2014/0023322 A1 | 1/2014 | Gniadek |
| 2014/0050446 A1 | 2/2014 | Chang |
| 2014/0133808 A1 | 5/2014 | Hill et al. |
| 2014/0334780 A1 | 11/2014 | Nguyen et al. |
| 2014/0348477 A1 | 11/2014 | Chang |
| 2015/0023646 A1 | 1/2015 | Belenkiy et al. |
| 2015/0078717 A1 | 3/2015 | Lin |
| 2015/0177467 A1 | 6/2015 | Gniadek et al. |
| 2015/0355417 A1 | 12/2015 | Takano et al. |
| 2015/0378113 A1 | 12/2015 | Good et al. |
| 2016/0085045 A1* | 3/2016 | Hill ................... G02B 6/3849 385/78 |
| 2016/0259135 A1 | 9/2016 | Gniadek et al. |
| 2017/0254966 A1 | 9/2017 | Gniadek et al. |
| 2018/0335577 A1* | 11/2018 | Wong ................. G02B 6/381 |

FOREIGN PATENT DOCUMENTS

| | | |
|---|---|---|
| CN | 201383588 Y | 1/2010 |
| DE | 19901473 A1 | 7/2000 |
| DE | 202006011910 U1 | 4/2007 |
| DE | 102006019335 A1 | 10/2007 |
| EP | 1072915 A2 | 1/2001 |
| EP | 1074868 A1 | 2/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009229545 A | 10/2009 |
| JP | 2009276493 A | 11/2009 |
| TW | 200821653 A | 5/2008 |
| WO | WO2001079904 A2 | 10/2001 |
| WO | WO2004027485 A1 | 4/2004 |
| WO | WO2008112986 A1 | 9/2008 |
| WO | WO2009135787 A1 | 11/2009 |
| WO | WO2010024851 A2 | 3/2010 |
| WO | WO2012136702 A1 | 10/2012 |
| WO | WO2012162385 A1 | 11/2012 |
| WO | WO2013052070 A1 | 4/2013 |
| WO | WO2013179197 | 12/2013 |
| WO | WO2014028527 A2 | 2/2014 |
| WO | WO2014182351 A1 | 11/2014 |
| WO | 2015/016897 A1 | 2/2015 |
| WO | 2016/072330 A1 | 5/2016 |

OTHER PUBLICATIONS

Non-Final Office Action, U.S. Appl. No. 15/979,473, dated Nov. 2, 2018.

International Search Report for PCT/US2018/033063, dated Jan. 23, 2019.

Opinion for PCT/US2018/033063, dated Jan. 23, 2019.

\* cited by examiner

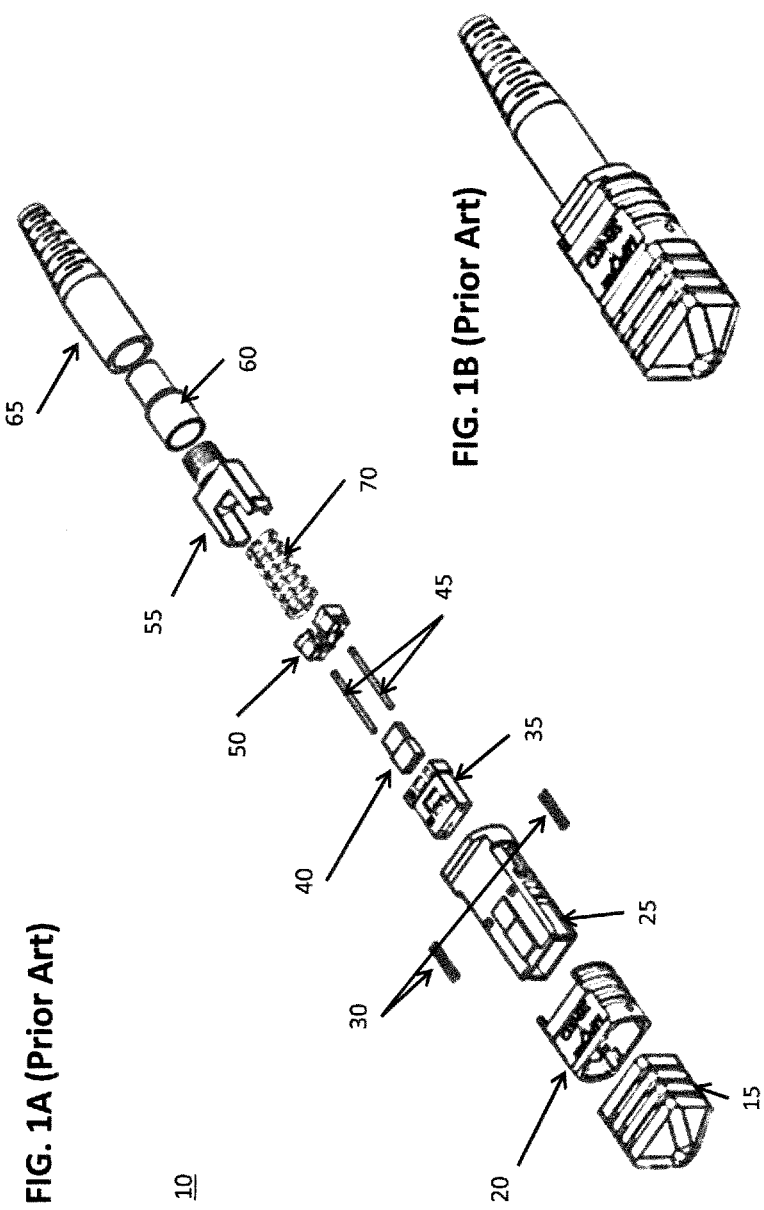

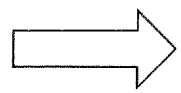
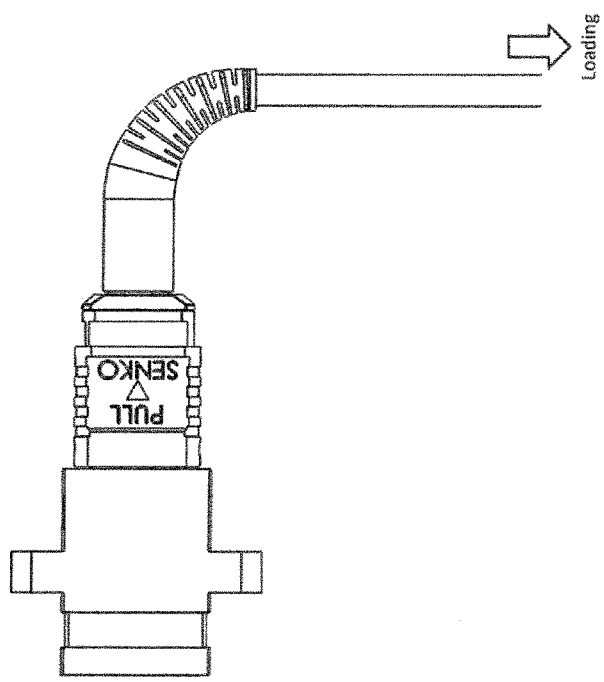
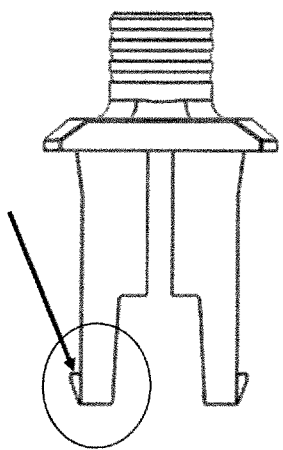
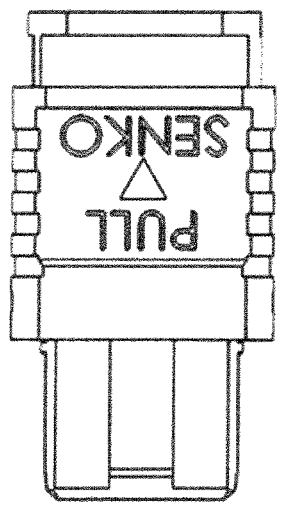
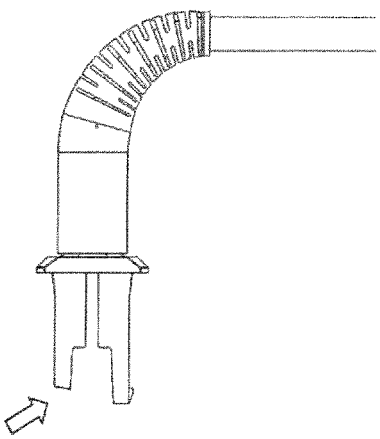
FIG. 2A Prior Art
FIG. 2B Prior Art
FIG. 2C Prior Art

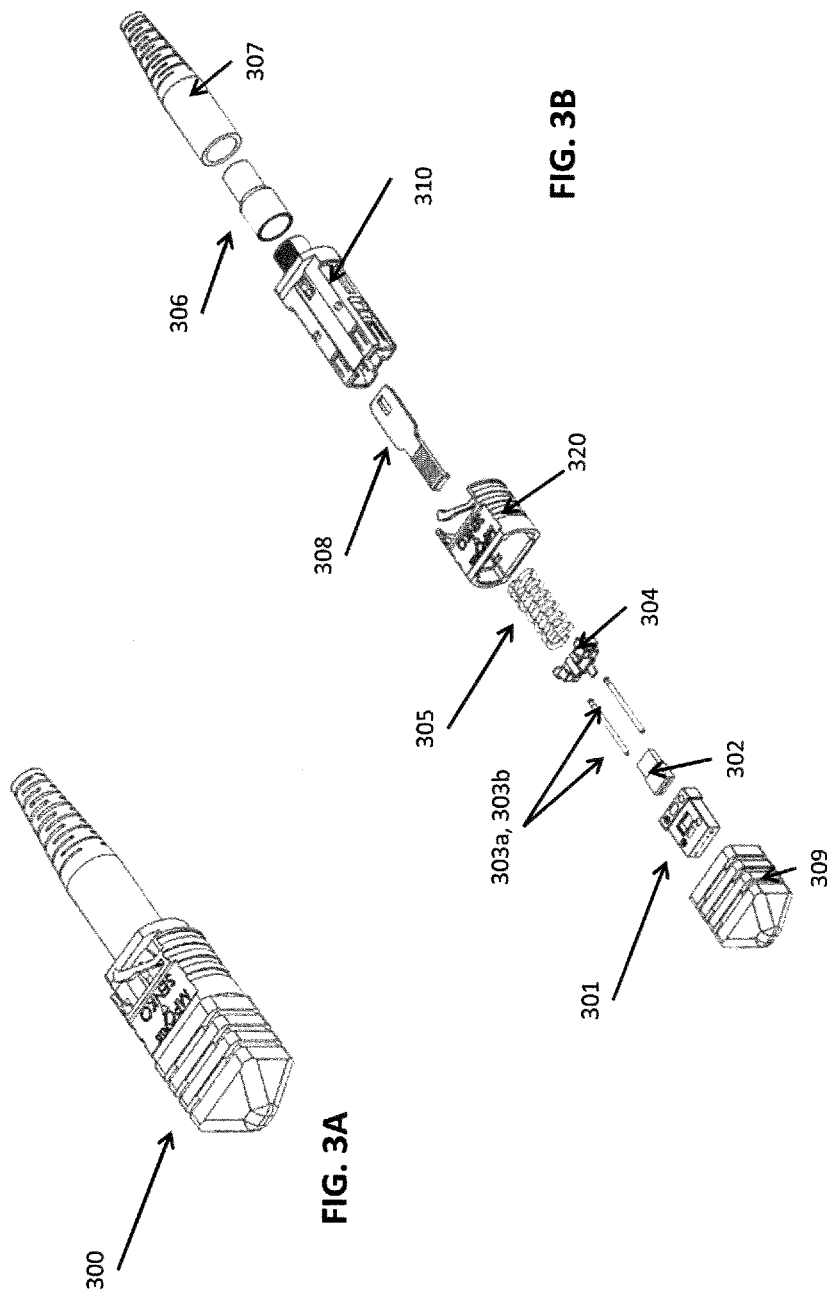

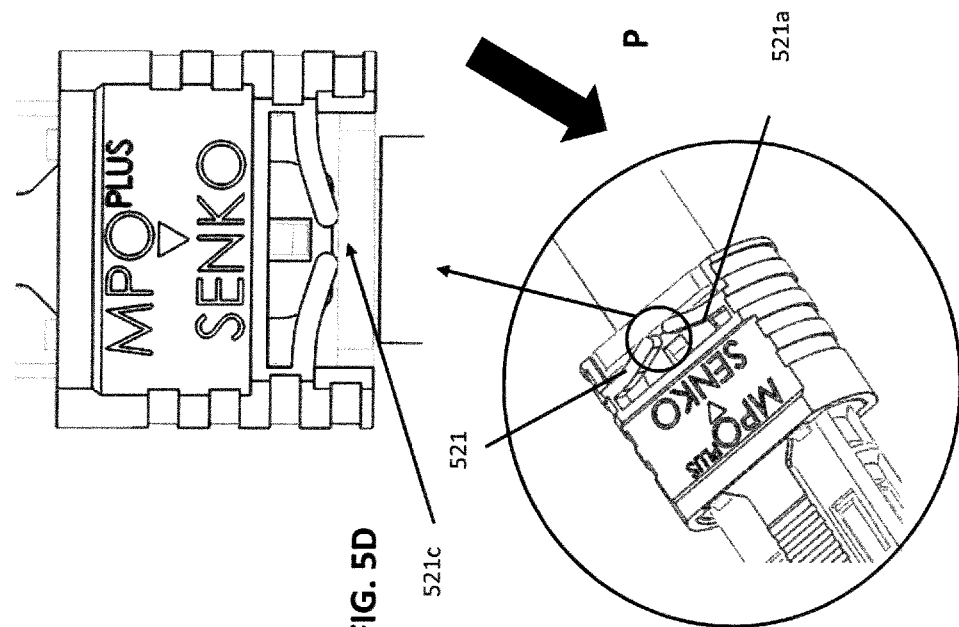
FIG. 5C
FIG. 5D
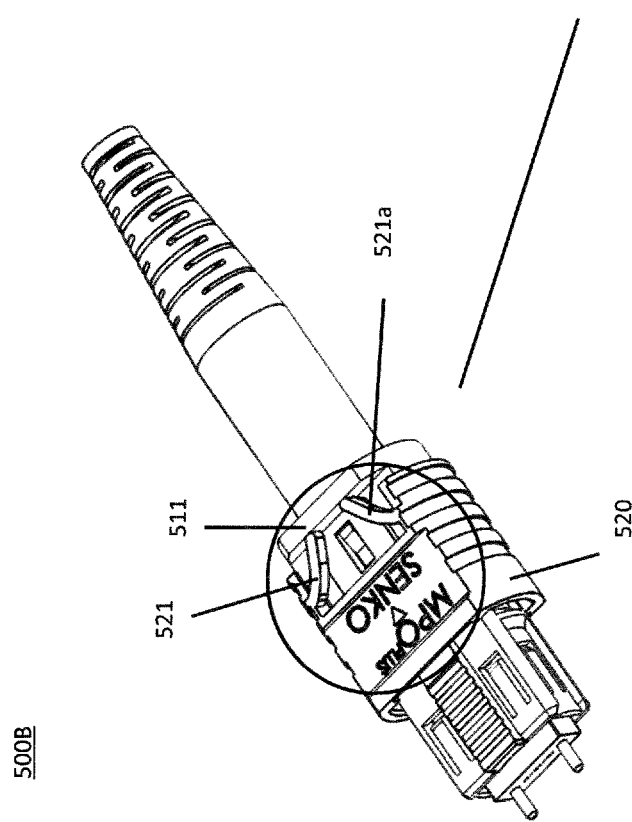
FIG. 5B

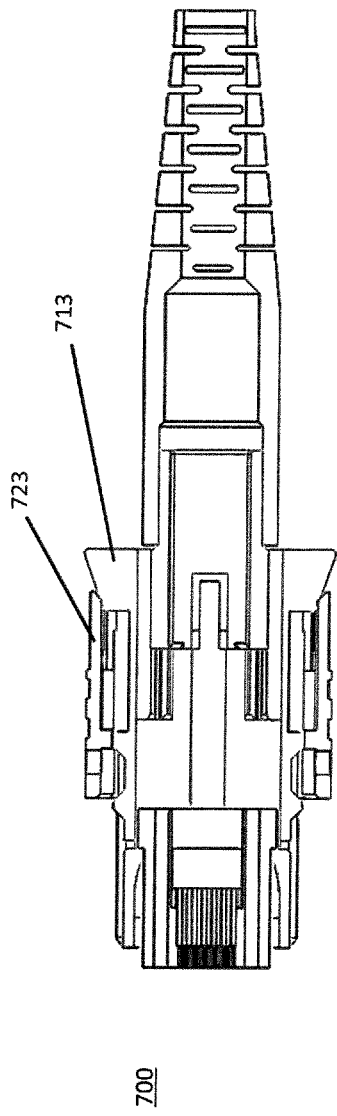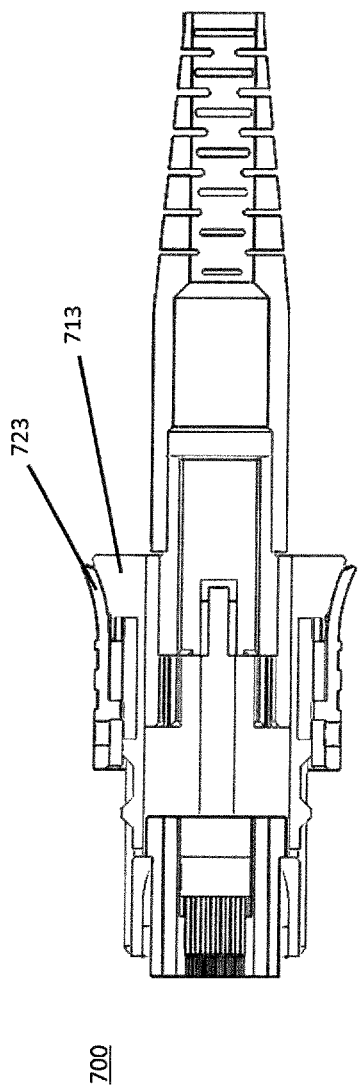
FIG. 7C
FIG. 7D

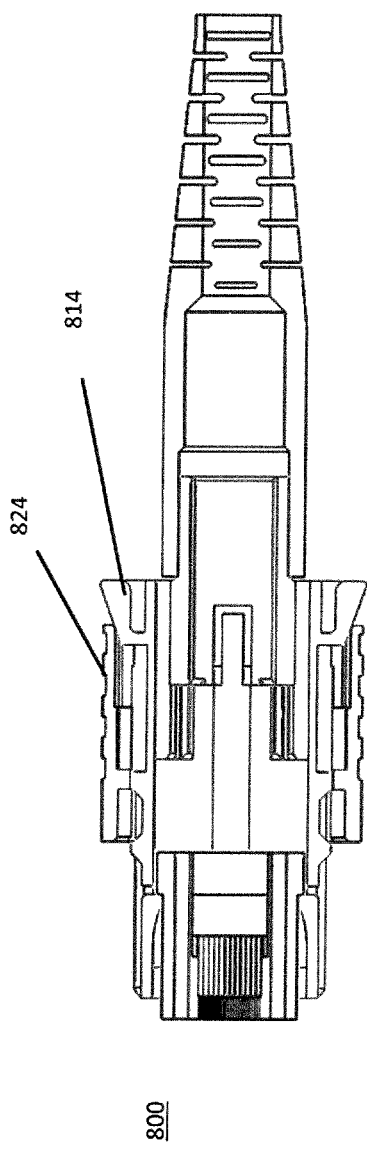
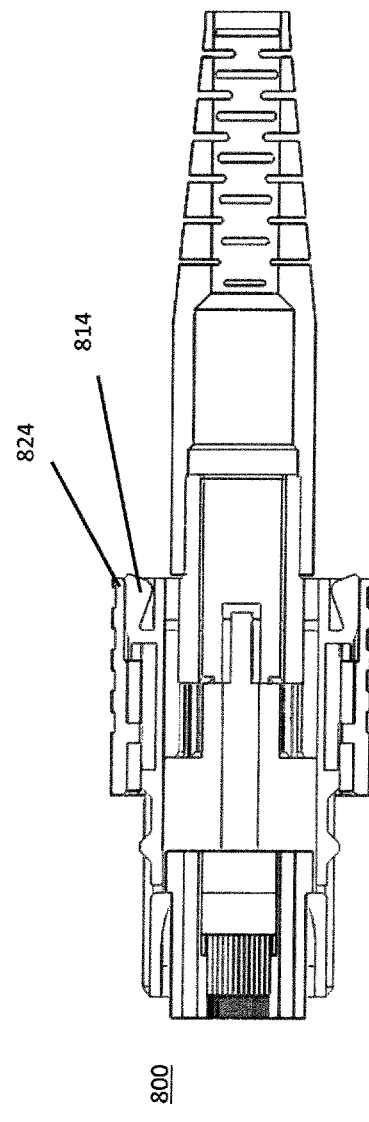
FIG. 9A
FIG. 9B

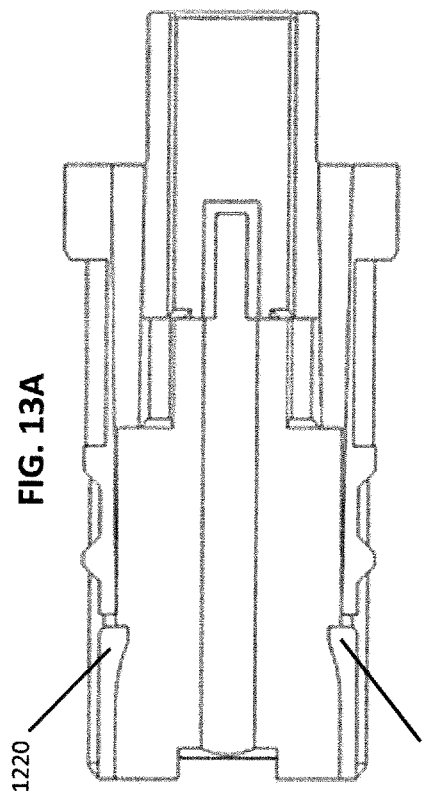
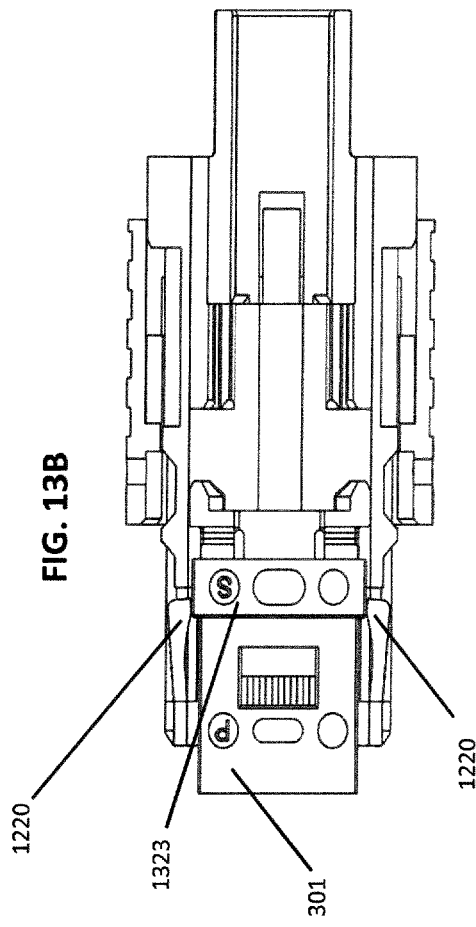
FIG. 13A
FIG. 13B

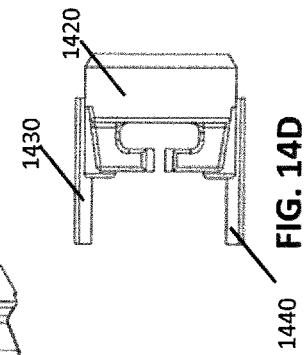
FIG. 14D
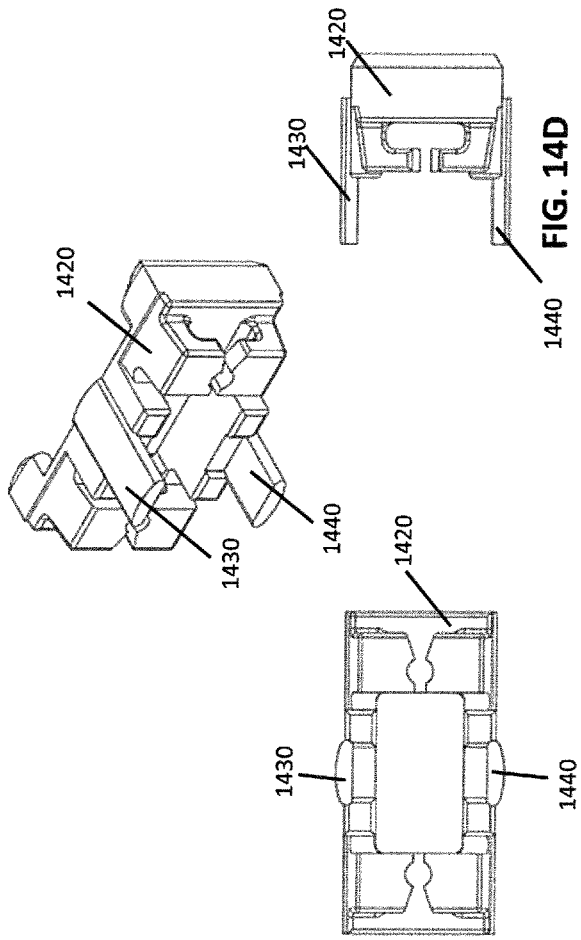
FIG. 14B
FIG. 14C
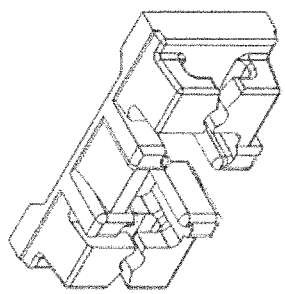
FIG. 14A (Prior Art)

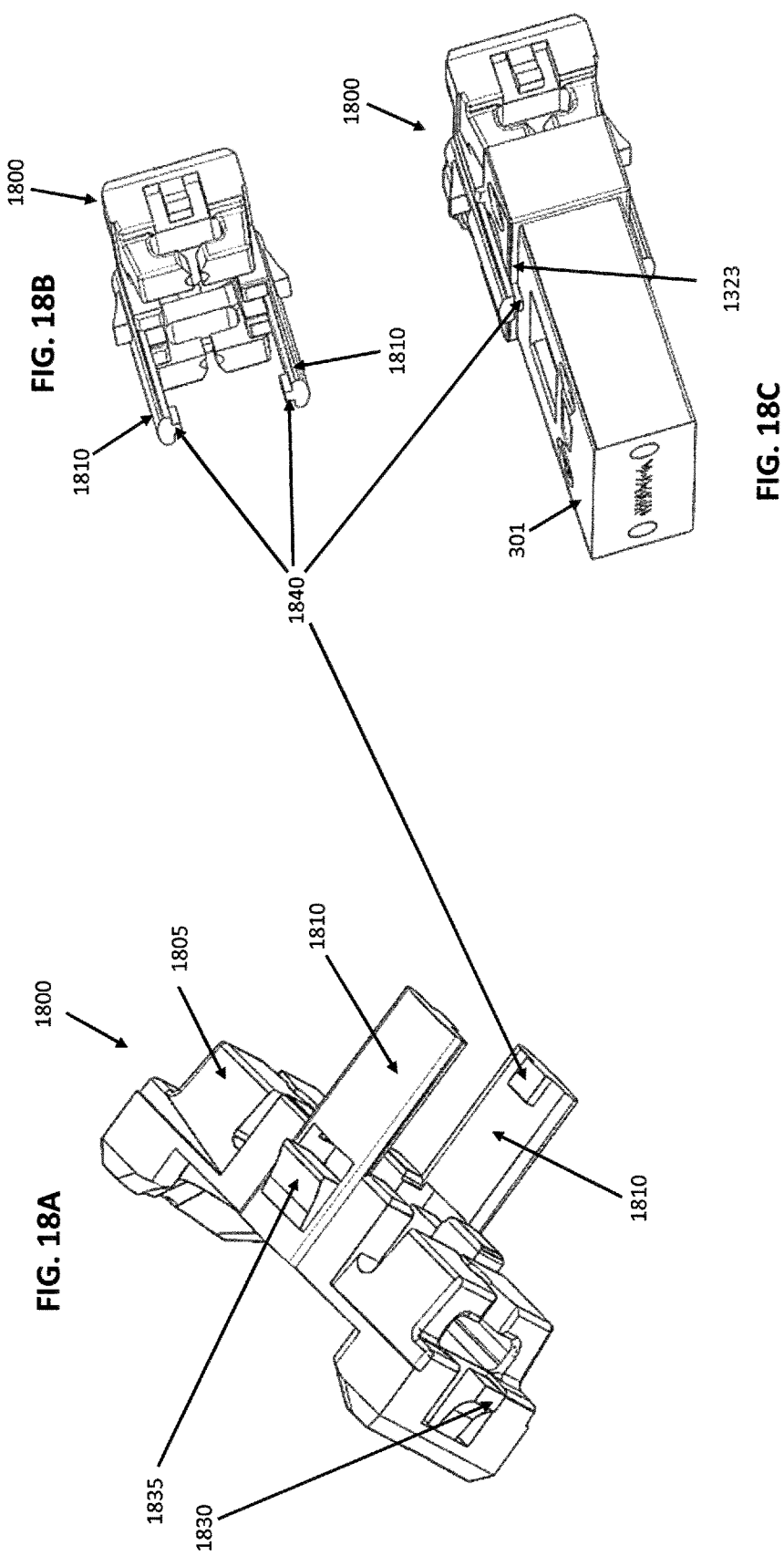

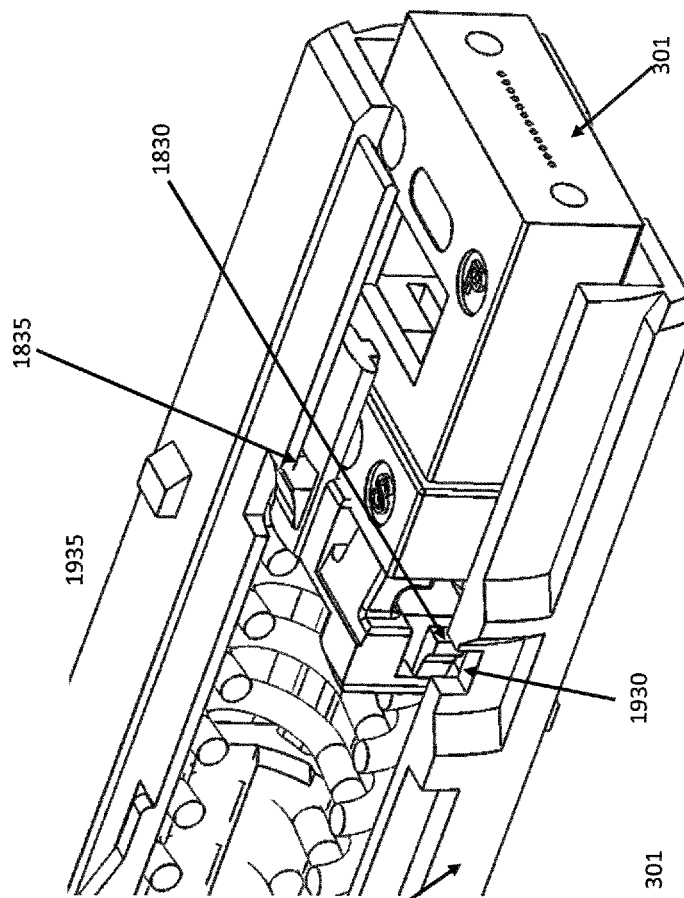
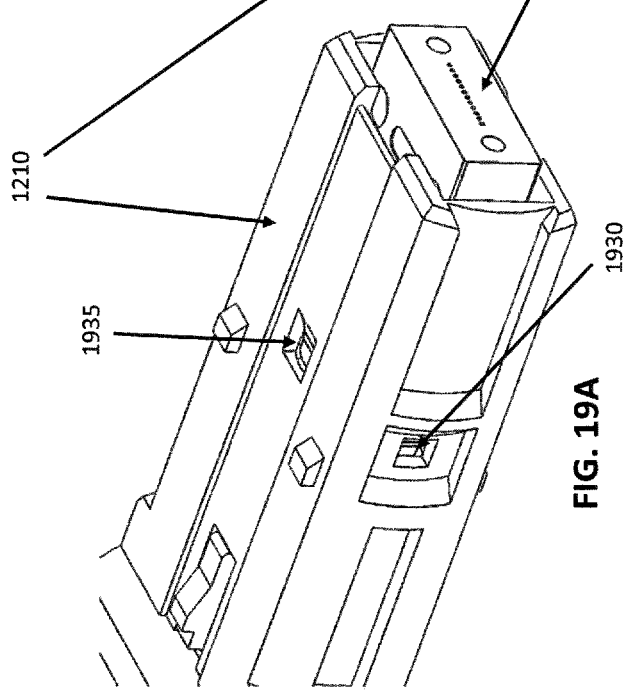
FIG. 19B
FIG. 19A

OPTICAL CONNECTOR WITH ONE-PIECE BODY

CROSS-REFERENCE TO RELATED APPLICATION

The present invention claims priority to U.S. Provisional Patent Application No. 62/508,390, the disclosure of which is incorporated by reference herein.

FIELD OF THE INVENTION

The present invention relates to optical connectors in general and, more particularly, to optical connectors having a one-piece housing-backpost configuration.

BACKGROUND

Demand for bandwidth by enterprises and individual consumers continues to rise exponentially. To meet this demand, fiber optics have become the standard cabling medium. Fiber optics relies on individual optical fibers of glass or polymers that are on the order of 250 microns in diameter. Data centers use high-density cabling, with individual fiber optic cables containing one or more optical fibers. Typically, in these high-density environments, MPO (multiple push on) connectors are used for connecting multiple optical fibers from a single multi-fiber cable. Fiber counts may be, for example, 8, 16, 32, or 64 fibers. MPO optical connectors are subject to high side-loading forces. These side-loading forces occur at equipment connection points due to the cables being bent in a downward direction. A side-loaded fiber optic cable is depicted in FIG. 2B.

Further, current optical connectors typically use many small components assembled into a single connector. An example of a prior art connector is depicted in FIG. 1A (exploded view) and FIG. 1B (assembled). Prior art connector 10 includes a dust cap 15 and an outer housing 20 that surrounds an inner housing 25 and employs micro springs 30 to bias the outer housing towards the distal (connection direction) end of the connector. From the proximal end, backpost 55, spring 70, pin keeper 50, guide pins 45, optical ferrule 35 and ferrule boot 40 are assembled into the inner housing 25. Crimp ring 60 and boot 65 are assembled over the end of an optical cable. Many designs use components that "snap fit" into each other during assembly. For example, in the connector of FIG. 1A, the backpost 55 snap fits into inner housing 25. Therefore, not only the side-loading stress during use but the stress of assembly may cause these components to break. Further mechanical stress is applied to the components during testing, such as in FIG. 2B (the arrow indicating the direction of loading), providing another occasion for components of an optical connector to fail.

Current optical connectors feature a backpost, shown in FIG. 1 and FIG. 2A. The backpost includes a pair of legs that may be prone to breaking at region 75 under side loads, as seen in the photograph of FIG. 2A. Typically, the backpost is fabricated from a polymeric component and is configured to snap fit into the connector housing. Breaking of a backpost leg may occur at the point where the backpost latches into the housing, as depicted by the arrow in FIG. 2C or at the corner of the backpost leg, where it meets the backpost base. The breaking of a connector may interrupt traffic carried by the optical fiber and requires a new connector to be spliced to the end of the fiber, a time-consuming process. Therefore, there is a need in the art for optical connectors that can withstand strong side-loading forces.

Fiber optic connectors typically feature an outer housing that is resiliently-biased in a forward direction by a pair of housing micro-springs, as seen in FIG. 1A and FIG. 4B. Manufacture of the connector is complicated by the presence of these springs which must be carefully assembled between the main body and the outer housing. Further, the springs may fail by being bent or by having adjacent spring coils entangle one another. Thus, there is a need in the art for fiber optic connectors that do not include micro-springs, to ease assembly and reduce potential connector failure.

SUMMARY

A multiple fiber push-on (MPO) optical connector is provided having a ferrule configured to house multiple optical fibers and including a stepped portion extending from at least one pair of opposing exterior surfaces of the ferrule. A one-piece housing-backpost is provided having a distal end in a connection direction and a proximal end in a cable direction. The one-piece housing-backpost is configured to receive a ferrule spring and the ferrule from the distal end. The housing-backpost includes at least one resiliently-deformable ferrule-retaining protrusion extending from a sidewall to engage the corresponding stepped portion of the ferrule. The resiliently-deformable ferrule-retaining protrusion is configured to deform towards the housing-backpost interior sidewall as the ferrule is inserted from the distal end and to extend outward against the stepped portion of the ferrule when the ferrule is seated in the housing-backpost to maintain the ferrule in the housing-backpost.

BRIEF DESCRIPTION OF THE DRAWINGS

FIG. 1A is an exploded view and FIG. 1B is an assembled view of a prior art optical connector;

FIGS. 2A, 2B, and 2C depict a prior art optical connector backpost;

FIGS. 3A and 3B are, respectively, assembled and exploded views of an optical connector according to an embodiment;

FIG. 5B is an assembled optical connector with a forward-biasing projection according to a further embodiment;

FIG. 5C is an enlarged view of the connector of FIG. 5B with dual forward-biasing projections activated but not touching as the housing is retracted;

FIG. 5D is a further enlarged view of the connector of FIG. 5B with the outer housing fully retracted;

FIGS. 7A-7D show an optical connector with a forward-biasing projection according to a further embodiment;

FIGS. 9A-9B show a cross-sectional view of the optical connector of FIGS. 8A-8B;

FIGS. 13A-13C depict a ferrule being inserted into a housing-backpost of an optical connector;

FIG. 14A depicts a prior art pin keeper; FIGS. 14B-14D respectively depict perspective, top, and side views of a pin keeper according to an embodiment;

FIGS. 18A-18C respectively depict perspective views of a pin keeper (FIGS. 18A and 18B) and a pin keeper/ferrule assembly (FIG. 18C) according to an embodiment;

FIGS. 19A-19B depict the pin keeper/ferrule assembly of FIG. 18C assembled in a housing-backpost;

DETAILED DESCRIPTION

Figure 4B:
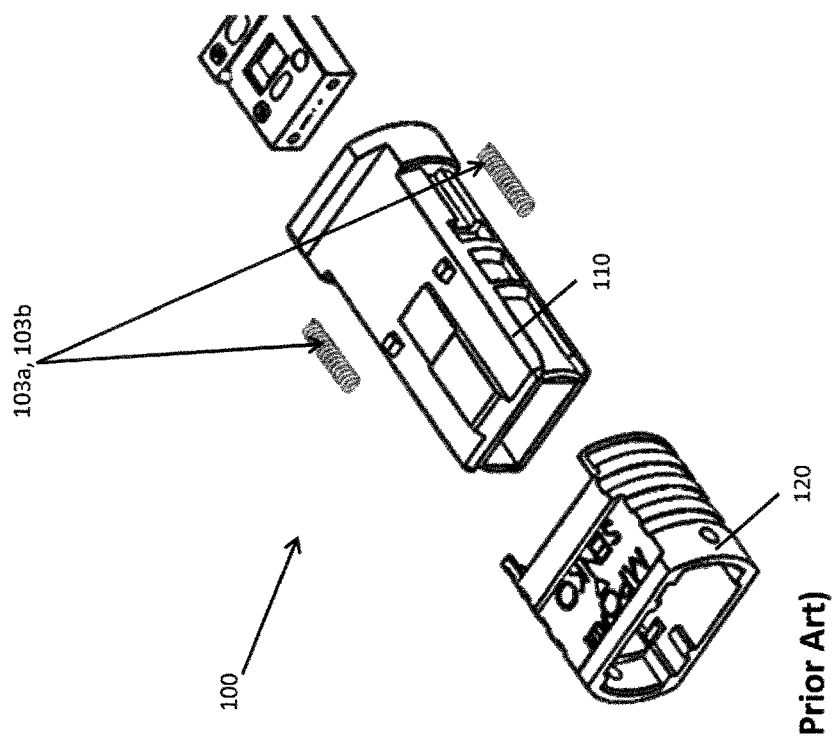
FIG. 4B is an enlarged view of the outer and inner housing of the prior art optical connector of FIGS. 1A and 1B.

This disclosure is not limited to the particular systems, devices and methods described, as these may vary. The terminology used in the description is for the purpose of describing the particular versions or embodiments only and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below. A connector, as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, an MPO connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable. As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals.

In describing the various embodiments, the term "distal," when used with an optical connector, refers to the connection direction of the optical connector. The term "proximal" refers to the cable direction of an optical connector. When used in connection with other parts, the term "proximal" refers to a location closest to a point of attachment of the part, while "distal" refers to a location furthest from a point of attachment of the part.

FIGS. 3A and 3B respectively depict an isometric view and an exploded view of an optical connector 300 according to an embodiment. The connector 300 may include a one-piece housing-backpost 310 configured to hold a ferrule 301. Note that the present embodiment may also be employed with the conventional two-piece inner housing and separate backpost combination of FIG. 1. The specification and claims use the expression "inner housing" generically to include either the one-piece housing-backpost or the two-piece housing plus backpost—the expression "inner" is used to differentiate the outer housing from the "inner" housing which the outer housing at least partially surrounds. Ferrule 301 may be a single-fiber or a multiple-fiber ferrule, urged towards a distal (connection) end of the housing by biasing member 305. It is depicted as a multiple-fiber MPO connector but it is understood that it could also be a single fiber connector or any of the connectors described above.

The optical connector 300 may further include a pin retainer 304 configured to receive a pair of guide pin 303*a*, 303*b* that extend into the ferrule 301. Depending on whether the connector is configured as a male, female, or reconfigurable connector, the guide pins may extend through the ferrule or the ferrule will have receiving apertures to accommodate guide pins from a mating connector. The biasing member 305, depicted in this embodiment as a spring, may be disposed between the housing 310 and the pin keeper/retainer 304 to bias the ferrule 301 distally within the housing 310. Such a spring force provides a biased mating of ferrule ends when the connector 300 is mated in an adapter or other connection to thereby hold the mated ferrule ends in contact with one another. An optional ferrule boot 307 is provided for fiber organization as the fibers extend into ferrule 301.

In use, a fiber optic cable is attached to the proximal end of connector 300, extending from a cable boot 307. The fiber optic cable may be retained with the housing 310 by means of a crimp ring 306, or any other type of detainment connector. A connector such as crimp ring 306 may be crimped to the inner housing as well as to a cable sheathing (e.g., aramid fiber sheathing) of the cable to thereby prevent the cable from being pulled away from the inner housing. The cable boot 307 is positioned over the crimped connection, providing support to an optical cable extending therethrough. The ferrule boot may be shaped to include an angle for connectors that will be subject to side loading to orient the cable 90 degrees from the connection direction.

Various optional accessories may be added to the basic optical connector. A polarity-changing key 308 that snap fits over inner housing 310 may be added to permit a user to change polarity of the optical connector, to be discussed in detail in connection with FIGS. 20A-20E, below. An optional dust cap 309 may also be added to fit over the distal end of connector to protect the ferrule and the optical fibers contained therein when the connector is not connected to a mating connector or other device.

The connector 300 may further include a displaceable outer housing 320 that is at least partially surrounding the inner housing 310 and slidably disposed about the inner housing 310 (and, optionally, key 308) adjacent the distal end of the connector 300.

Figure 4A:
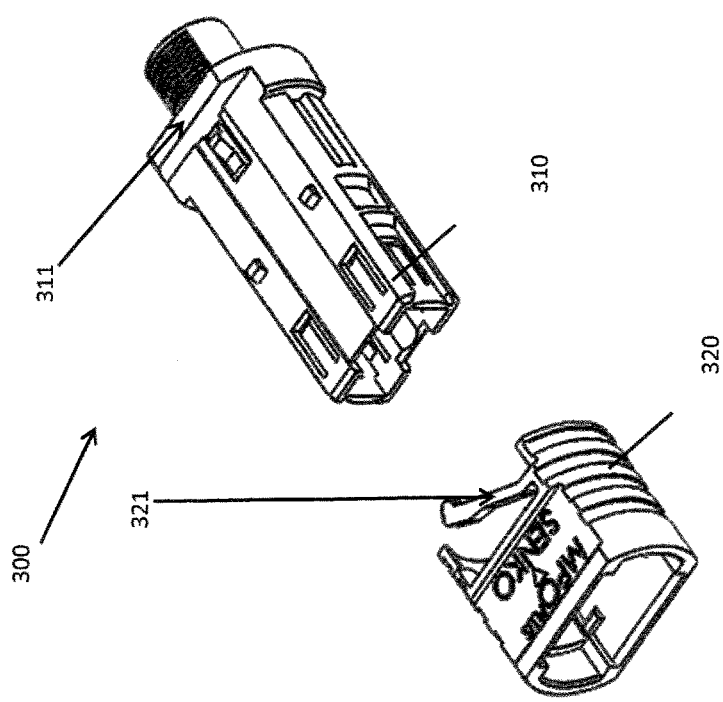
FIG. 4A is an enlarged view of an outer and inner housing of the optical connector of FIGS. 3A-3B.

FIG. 4A-4B provide a detailed comparison between the optical connector 300 of the present embodiment and the prior art connector of FIG. 1. As seen in FIG. 4A, the outer housing 320 of the optical connector 300 of the present embodiment may have a resilient forward biasing projection 321 integrally formed with and extending from the outer housing for biasing the outer housing towards the distal end of the inner housing 310. In contrast to the prior art connector as shown in FIG. 4B, wherein a pair of micro-springs 103a and 103b are used for biasing an outer housing 120 towards the distal end of a main body 110, the optical connector 300 of the present embodiment does not include micro-springs. Therefore, assembly is simplified and potential connector failure is reduced.

Figure 4C:
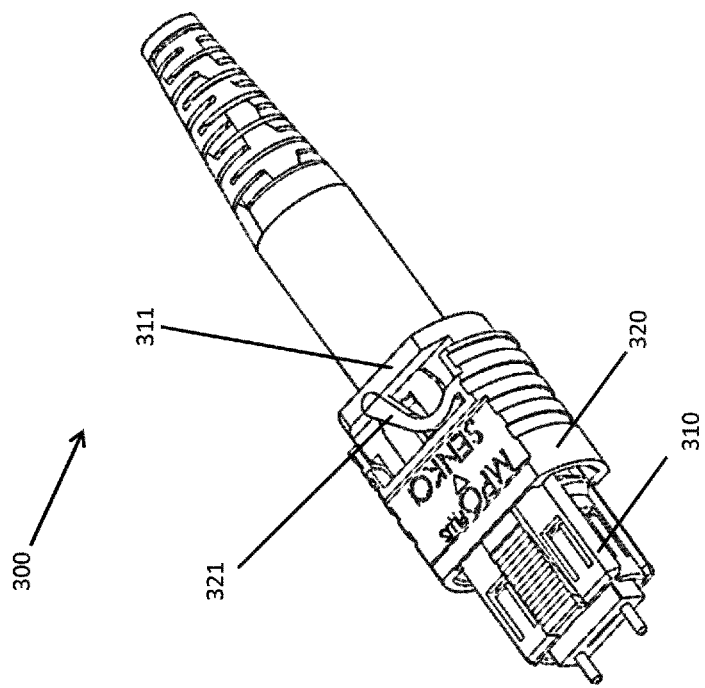
FIG. 4C is an assembled view of the optical connector of FIG. 4A.

FIG. 4C shows the optical connector 300 according to the present embodiment after assembly. As seen in FIG. 4C, the resilient forward biasing projection 321 may be a bendable arm integrally formed with and protruding from the outer housing 320. The bendable arm 321 is configured to contact a flange 311 of the inner housing 310. When the outer housing 320 is pulled towards the proximal (cable) direction along the inner housing 310, the bendable arm 321 is bent. The bent arm 321 then exerts a restoring force to bias the outer housing back towards the distal end of the inner housing.

Figure 5A:
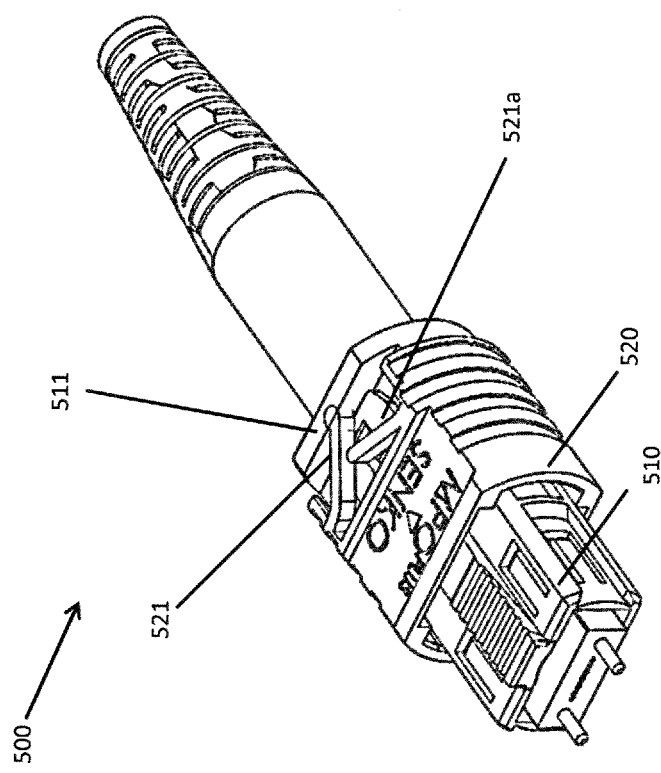
FIG. 5A is an assembled optical connector with a forward-biasing projection according to a further embodiment.

FIG. 5A shows an optical connector according to a further embodiment. As seen in FIG. 5A, a bendable arm 521 is integrally formed with and protruding from an outer housing 520. The bendable arm 521 is configured to contact a flange 511 of an inner housing 510. In addition to the primary bendable arm 521, the optical connector 500 further includes an auxiliary bendable arm 521a protruding from the outer housing 520 and configured to act on the primary bendable arm 521 to enhance the elastic force for biasing the outer housing 520 towards the distal end of the inner housing 510.

FIG. 5B shows an optical connector according to a further embodiment. In the embodiment of FIG. 5B there are two separate bendable arms 521, 521a protruding from the outer housing 520 and configured to independently bias outer housing 520 towards distal end of inner housing 510. That is, the bendable arms 521, 521a do not contact one another in either an unbiased or biased position. FIG. 5C is an enlarged view of the arms (521, 521a) in an activated position, that is, as the outer housing is being retracted towards the proximal direction; the arms 521, 521a do not touch each other as they are compressed. FIG. 5D is an enlarged view showing a gap 521c between arms 521 and 521a even when they are fully compressed as the outer housing is fully retracted.

Figure 5F:
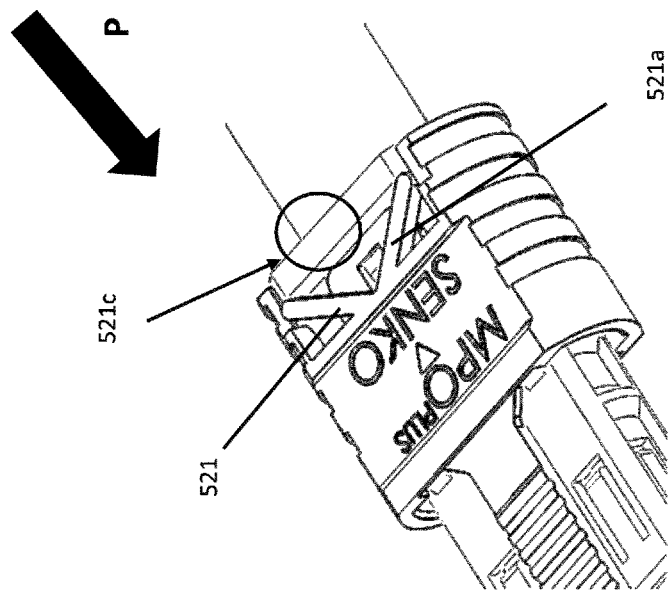
FIG. 5F is an enlarged view of the connector of FIG. 5E as the outer housing is retracted showing forward-biasing projections activated but not touching.
Figure 5E:
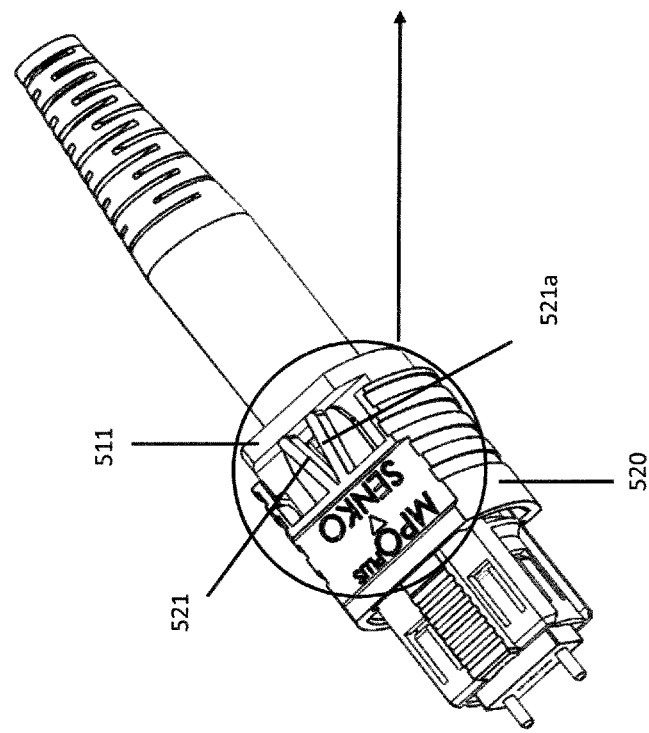
FIG. 5E is an assembled optical connector with forward-biasing projections according to a further embodiment.

FIG. 5E depicts another embodiment of bendable arms (521, 521a) that do not touch as the outer housing is retracted and are likewise configured to independently bias outer housing 520 towards distal end of inner housing 510. FIG. 5F is an enlarged view of a gap 521c between the arms 521, 521a as the outer housing is retracted in the proximal direction. Without departing from the scope of the invention, one, two or more bendable arms can be used to perform biasing as described above.

Note that many variations of bendable arms may be used in the disclosed connectors including more than two bendable arms. Note also that the same configurations depicted in the above FIGS. may be present as well on the reverse side of the connector to provide additional spring force biasing the outer connector in the distal direction.

Figure 6B:
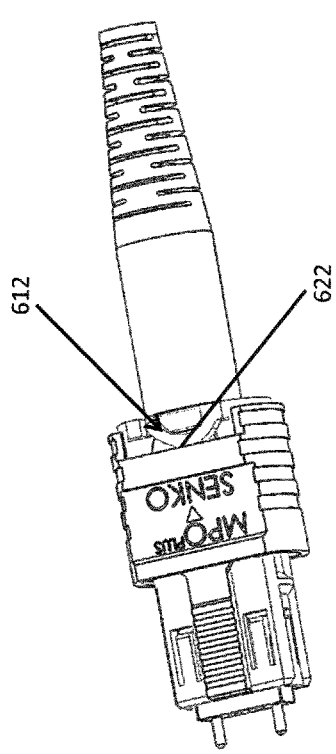
FIG. 6A-6C show an optical connector with a forward-biasing projection according to a further embodiment.
Figure 6C:
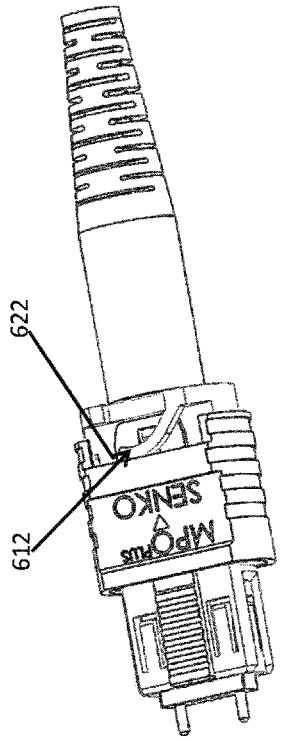
Figure 6A:
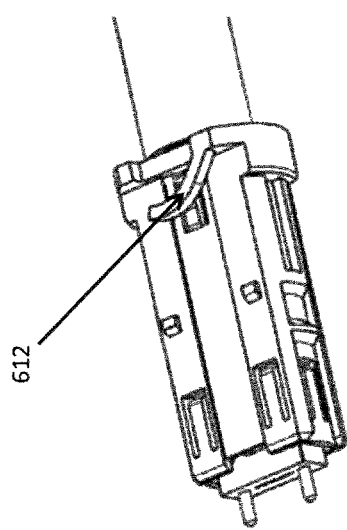

FIGS. 6A-6C show an optical connector 600 according to another embodiment wherein the resilient forward biasing projection is extending from the inner housing. As seen in FIG. 6A, the optical connector 600 includes an inner housing 610 having a bendable arm 612 integrally formed with and protruding from the inner housing. As shown in FIG. 6B, the bendable arm 612 of the inner housing 610 is configured to contact a surface 622 at the end of the outer housing 620 after assembling. In FIG. 6B, the outer housing has been retracted/pulled towards the proximal (cable) direction, compressing the bendable arm 612. In FIG. 6C, the bendable arm exerts a restoring force against surface outer housing surface 622 to bias the outer housing towards the distal end of the inner housing. Although not shown in FIGS. 6A-C, multiple arms similar to those depicted in FIGS. 5A-5F could also be used with the inner housing to bias the outer housing towards the distal direction.

Figure 7B:
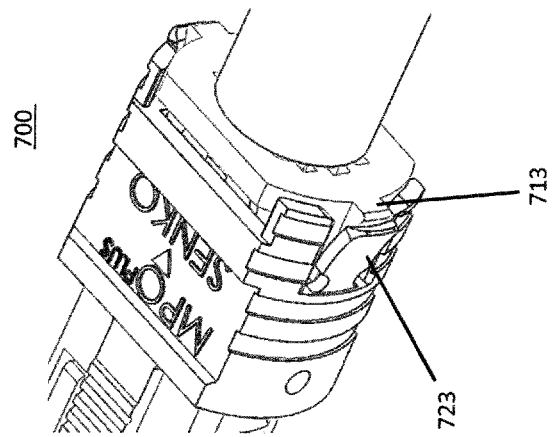
Figure 7A:
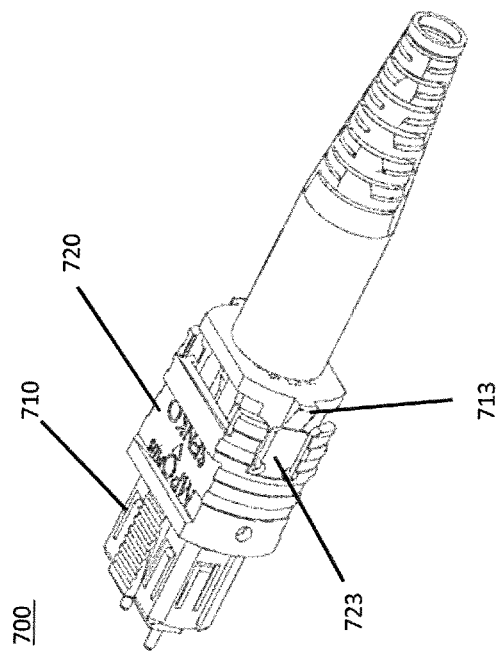

FIGS. 7A-7B show an optical connector 700 according to a further embodiment. As shown in FIG. 7A, the optical connector 700 has a resilient forward-biasing projection in the form of one or more ramps 713 extending at the proximal end of inner housing 710. Cooperating with the ramps 713 are one or more flexing wings 723 formed at the proximal end of an outer housing 720. As shown in FIG. 7B, when the outer housing is retracted in the proximal direction, the flexing wings 723 of the outer housing extend outwardly as they are pushed open by the ramps 713 of the inner housing. FIG. 7C shows a cross-sectional view of the optical connector 700 when the outer housing is at its forwardly-biased position. FIG. 7D shows a cross-sectional view of the optical connector 700 when the outer housing is retracted towards the proximal direction. It can be seen that the flexing wings 723 are deformed outwardly; this deformation creates a restoring force against the ramps 713 to bias the outer housing towards the distal end of the inner housing 710.

Figure 8B:
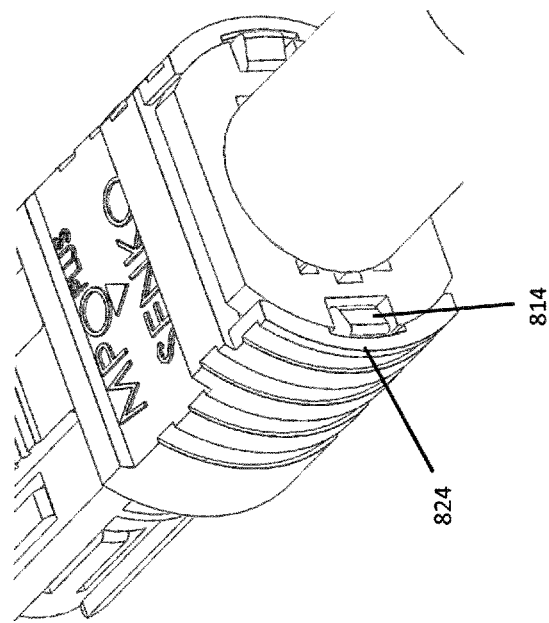
FIGS. 8A-8B show an optical connector with a forward-biasing projection according to a further embodiment.
Figure 8A:
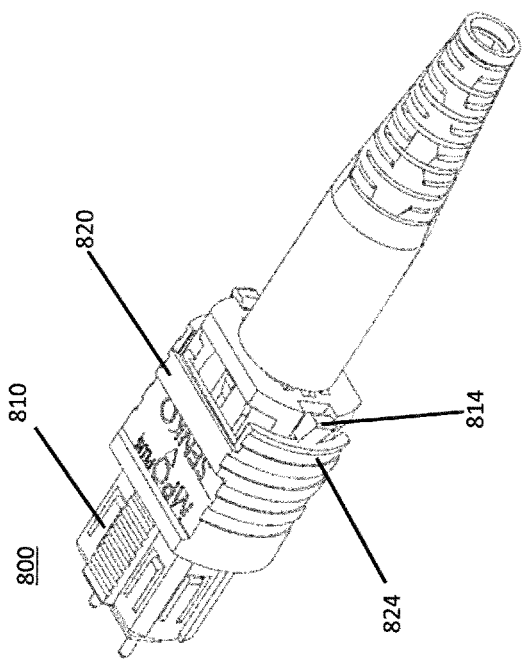

FIGS. 8A-8B show an optical connector 800 according to a further embodiment. As seen in FIG. 8A, the optical connector 800 may include a resilient forward-biasing projection in the form of one or more flexing wedges 814 integrally formed at the proximal end of an inner housing 810. Cooperating with the flexing wedges is a rigid edge 824 of outer housing 820 at its proximal end. As shown in FIG. 8B, when the outer housing is retracted towards the proximal direction, the flexing wedges 814 of the inner housing bend inwardly upon contacting the edge 824 of the outer housing.

FIG. 9A shows a cross-sectional view of the optical connector 800 when the outer housing is at its forwardly-biased position while FIG. 9B shows a cross-sectional view of the optical connector 800 when the outer housing is retracted in the proximal direction. It can be seen that the flexing wedges 814 are deformed inwardly, toward the interior of the inner housing. In this configuration, a restoring force is exerted against the outer housing edge 824 to bias the outer housing towards the distal end of the inner housing.

Figure 10B:
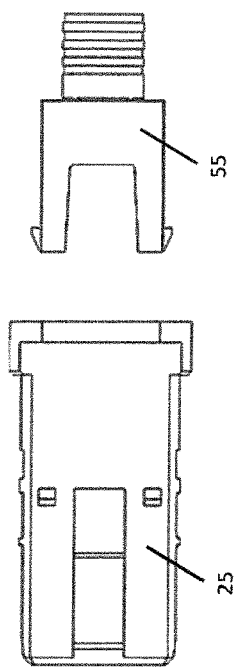
FIGS. 10A-10B depict an exploded and side view of a prior art optical connector.
Figure 11B:
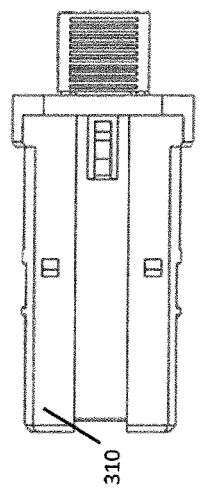
FIGS. 11A-11B depict an exploded and side view of an optical connector according to an embodiment.
Figure 10A:
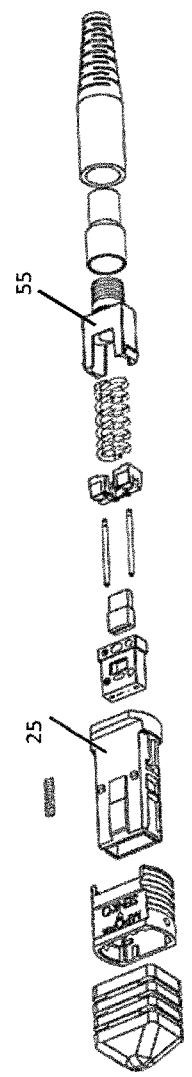
Figure 11A:
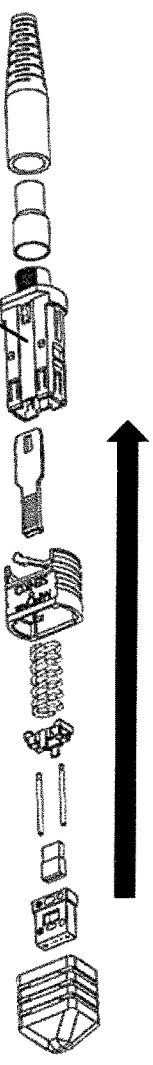

FIGS. 10A-10B depict a prior art connector having a separate backpost and housing compared to FIGS. 11A-11B showing a connector according to a present embodiment. As seen in FIG. 10A, the prior art connector with a separate backpost assembles components from a proximal (cable) end direction, as shown by the arrow direction, while the connector of the present embodiment, FIG. 11A (substantially similar to FIG. 3B), assembles components from a distal (connection direction) end, as shown by the arrow. The two-piece housing/backpost configuration of FIG. 10B is replaced by the one-piece housing-backpost component 310 of FIG. 11B.

Advantageously, forming an integrated, one-piece housing-backpost permits fabrication of the housing-backpost from a variety of materials including polymers, reinforced polymers, ceramics, and metals. In particular, the housing-backpost may be fabricated from die cast metal to increase component strength.

Figure 12:
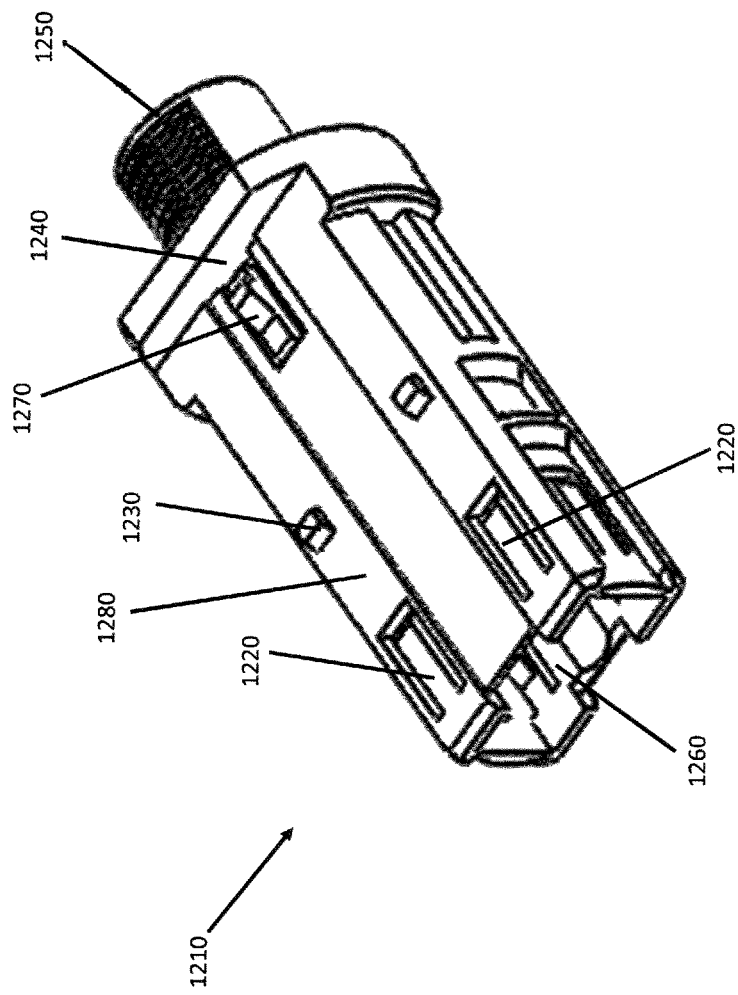
FIG. 12 depicts a perspective view of a housing-backpost of an optical connector.
Figure 13C:
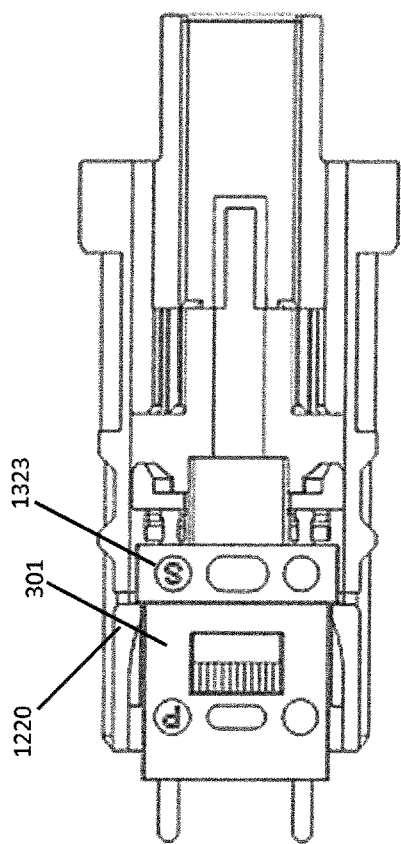

An enlarged view of the one-piece housing-backpost is depicted in FIG. 12. The one-piece housing-backpost 1210 (substantially similar to housing-backpost 310) includes a large, approximately central distal aperture 1260 for receiving the ferrule spring 305 and the ferrule 301. A first sidewall 1280 is positioned along the top of housing-backpost 1210 while a second sidewall is positioned along the bottom of housing-backpost 1210. Positioned in the first sidewall is one or more resiliently-deformable ferrule-retaining protrusions 1220 extending inwardly from the sidewall to engage the corresponding stepped portion of the ferrule. In the perspective view of FIG. 12, only the external portion of the protrusion is visible; FIG. 13A depicts a cross-sectional view of the housing-backpost where the protruding portion of the protrusion 1220 is best seen. By being formed as a cutout in the housing-backpost, the protrusion 1220 can flex outwardly during insertion of the ferrule, accommodating the stepped portion of the ferrule, to be discussed in connection with FIGS. 13A-C below.

The one-piece housing-backpost 1210 further includes guide projections 1230 and projection 1270 for engaging a polarity-changing key, to be discussed in further detail below. A ridged, approximately cylindrical portion 1250 extends from a collar 1240 to accommodate a crimp ring 306 during connector assembly.

Turning to FIGS. 13A-13C, the protrusion 1220 may be clearly seen in the cross-sectional views of 13A (unassembled), 13B (as ferrule enters the housing-backpost), and 13C (with ferrule assembled). As seen in FIG. 13B, the protrusion 1220 flexes/deforms outwardly as the ferrule stepped portion 1323 is inserted from the distal end into the housing-backpost 1210. After the ferrule is seated in the housing-backpost 1210, the protrusion 1220 returns to its initial position, as shown in FIG. 13C, preventing forward movement of the ferrule as it butts against the stepped portion 1323 to maintain the ferrule 301 in the housing-backpost.

Figure 15:
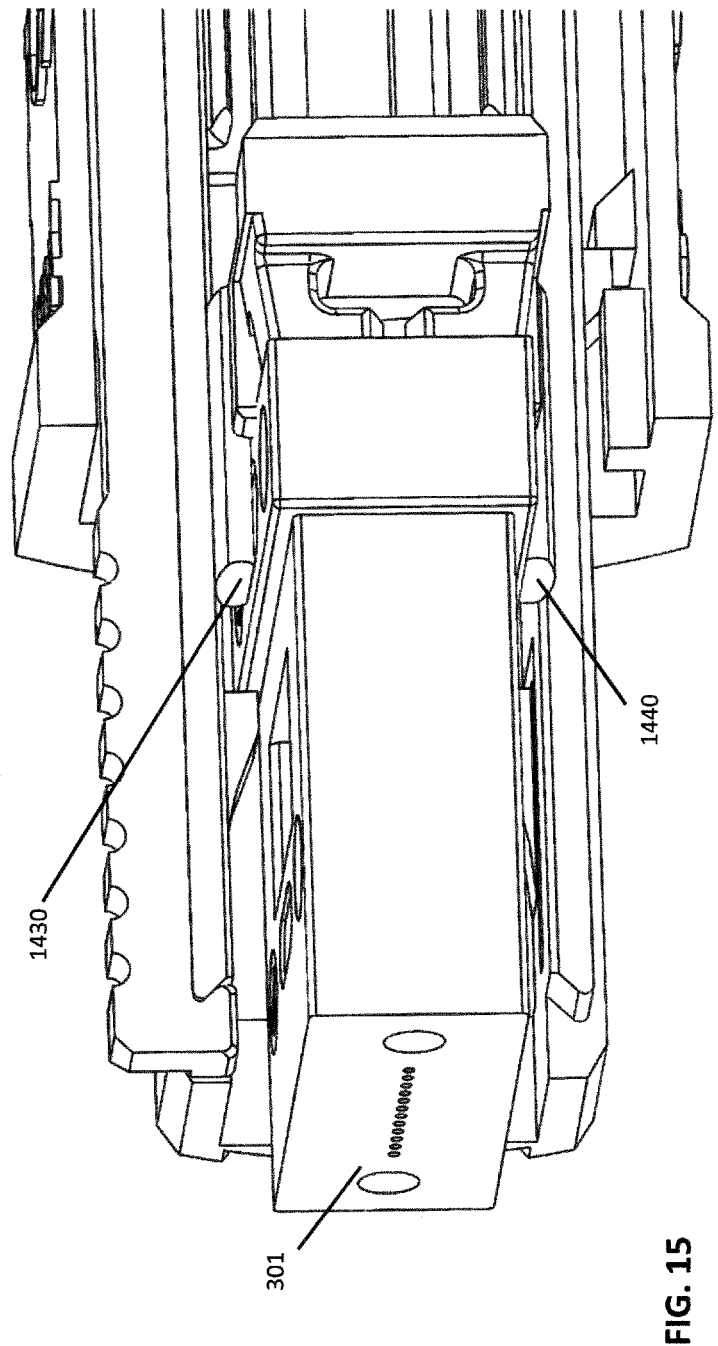
FIG. 15 depicts a partial cross-sectional view of a ferrule and the pin keeper of FIGS. 14B-14D.

To further assist in retaining the ferrule 301 within the housing-backpost 1210, the pin keeper of FIGS. 14B-14D may optionally be provided. As compared with a conventional pin keeper, FIG. 14A, the pin keeper of FIGS. 14B-D includes a pin keeper main body and a top arm 1430 and bottom arm 1440 respectively extending from a main body 1420. As seen in the assembled cross-sectional view of FIG. 15, top arm 1430 and bottom arm 1440 retain the ferrule 301 in the one-piece housing-backpost 1210, preventing the ferrule from rotating and detaching from the protrusion 1220.

Figure 16:
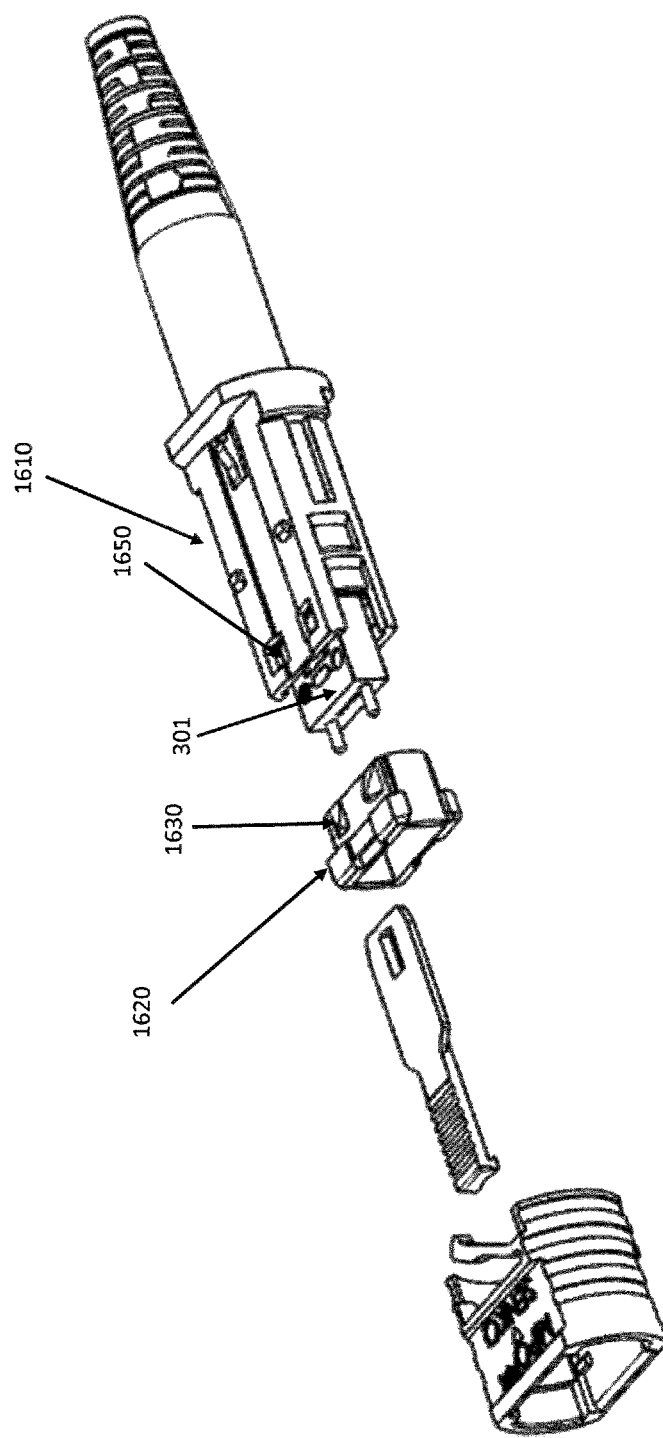
FIG. 16 depicts an exploded view of an optical connector according to an embodiment.
Figure 17:
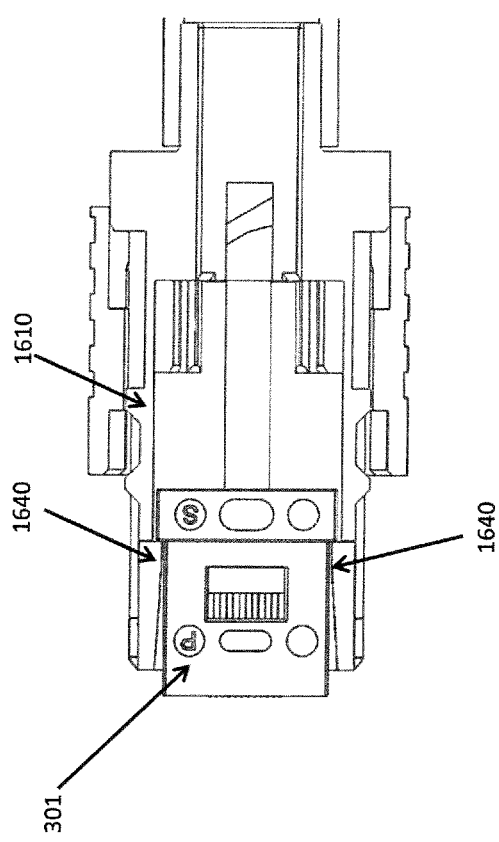
FIG. 17 depicts an enlarged side view in partial cross section of the ferrule, clip and housing-backpost of FIG. 16.

In an alternative embodiment, a retaining clip may be provided to maintain the ferrule in a seated position within a one-piece housing-backpost 1610. As seen in FIG. 16, a clip 1620 is positioned in the distal end of the housing-backpost to retain the ferrule in the housing/backpost. The clip 1620 includes one or more protrusions 1630. These protrusions 1630 are retained within one or more sidewall apertures 1650 of the housing-backpost 1210. Within the clip 1620, angled sidewalls 1640 (shown in FIG. 17) narrow from the distal end towards the proximal end that contacts the ferrule stepped portion 1323 to retain the ferrule within the housing-backpost 1210.

FIGS. 18A-18C and 19A-19B depict a further embodiment for maintaining a ferrule 301 within a one-piece housing-backpost 310 configured to receive a ferrule spring 305, a pin keeper 1800 and the ferrule 301 from the distal end. The pin keeper includes a main body 1805 and top and bottom arms 1810 respectively extending from the main body 1805 (FIGS. 18A, 18B). The top and bottom arms 1810 include ferrule-retaining projections 1840 (FIGS. 18A-18C) configured to grip the ferrule 301 adjacent the stepped portion 1323 (FIG. 18C). The pin keeper main body 1805 includes a first pair of deformable projections 1830 positioned on side regions of pin keeper 1800. Optionally, a second pair of deformable projections 1835 (FIG. 18A) may be positioned on the top and bottom of pin keeper 1800. The deformable projections 1830, 1835 engage in mating apertures 1930, 1935 (FIGS. 19A-19B) in the housing-backpost 1210 to retain the pin keeper 1800 in the housing-backpost 1210. By engaging the projections 1830, 1835 from the pin keeper 1800 in the housing-backpost aperture 1930, 1935, the spring force from ferrule spring 305 is absorbed by the housing-backpost, preventing the ferrule 301 from being pushed out of the housing-backpost 1210.

FIGS. 20A-20E depict a removable polarity-changing key 2010 that may be used with all embodiments of the present disclosure. As a result of using pre-terminated fiber assemblies, the issue of maintaining polarity in parallel fiber-optic links is becoming increasingly important. Polarity maintains proper continuity between transmitting and receiving elements in an optical network. In order to make sure that connectors are mated correctly with a receiving element such as an adapter or a transceiver, both the connector and the receiving element typically include keying features that permit the connector to be mated with the receiving element in generally only one mating configuration. The present embodiment uses a removable polarity-changing key in order to facilitate changing a connector from one polarity configuration to a configuration of the opposite polarity. The polarity-changing key 2010 and its mating elements may be selected from any of those disclosed in U.S. Pat. No. 9,658,409, the disclosure of which is incorporated by reference herein.

Figure 20D:
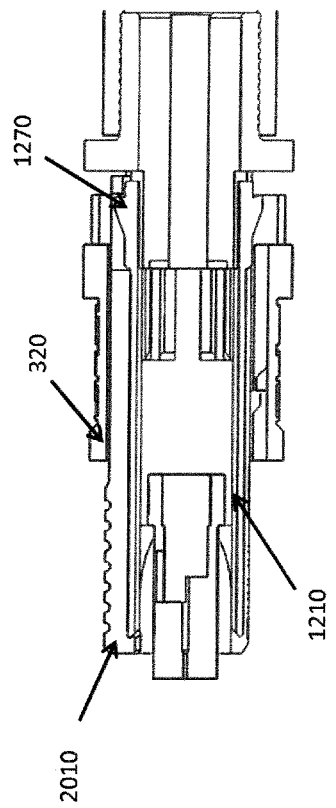
FIGS. 20A-20E depict assembly and removal of a polarity-changing key that may be used with any of the optical connectors of the disclosure.
Figure 20E:
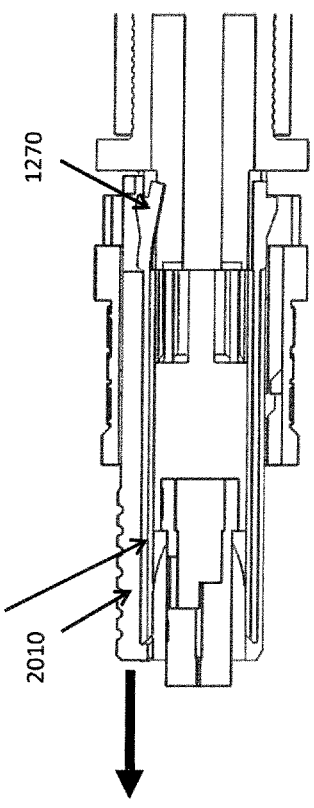
Figure 20A:
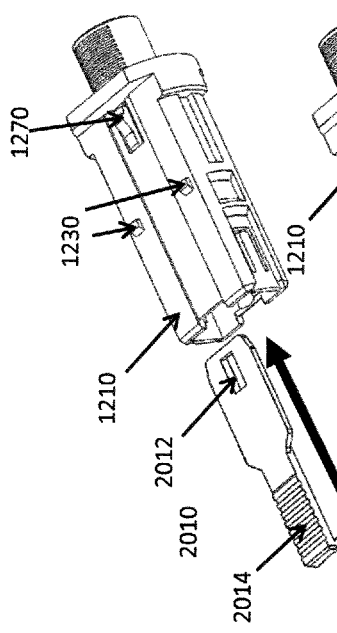
Figure 20B:
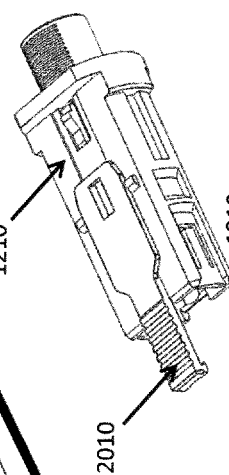
Figure 20C:
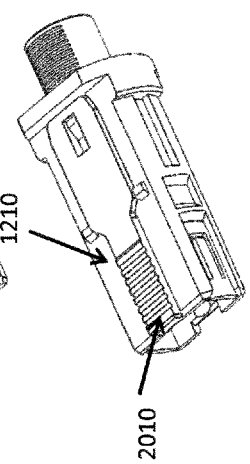

As seen in FIG. 20A, polarity-changing key 2010 includes an aperture 2012 and a gripping portion 2014. To facilitate user manipulation of the key, one or more ridges may be formed in the gripping portion 2014, as shown. The housing-backpost includes a key-engagement projection 1270 over which the key 2010 may be inserted to engage the projection within the key aperture 2012. The projection 1270 may be tapered outwardly away from the housing-backpost 1210 to facilitate movement of the key 2010 over the key projection 1270. Guide projections 1230 are spaced at approximately the width of the key 2010 on the housing backpost to guide the key towards the projection 1270 as the key is slid in from the distal end as shown by the arrow in FIG. 20A. As seen in FIG. 20B, the key 2010 slides between the guide projections 1230 to engage the key projection 1270 (FIG. 20C).

Turning to the cross-sectional views of FIGS. 20D and 20E, the polarity-changing key 2010 is shown engaged on projection 1270 in FIG. 20D. For removal of the polarity-changing key 2010, the key projection 1270 is depressed in FIG. 20E and the key slides off housing-backpost 1210 in the distal direction is shown by the arrow. A key projection 1270 and guide projections 1230 are also provided on the opposite surface of the housing-backpost 1210. To reverse the polarity of the connector, the key 2010 is reinserted via these opposite-surface projections.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A multi-fiber push on optical connector comprising:
a ferrule configured to house multiple optical fibers and including a stepped portion extending from at least one pair of opposing exterior surfaces of the ferrule;
a one-piece housing-backpost having a distal end in a connection direction and a proximal end in a cable direction and configured to receive a ferrule spring and the ferrule from the distal end;
the housing-backpost having at least one pair of opposing interior side walls and at least one resiliently-deformable ferrule-retaining protrusion extending from the sidewall to engage the corresponding stepped portion of the ferrule, the resiliently-deformable ferrule-retaining protrusion being configured to deform towards the housing-backpost interior sidewall as the ferrule is inserted from the distal end and to extend outward against the stepped portion of the ferrule when the ferrule is seated in the housing-backpost to maintain the ferrule in the housing-backpost.

2. The multi-fiber push-on optical connector of claim 1, further comprising a pin keeper having a main body and a top arm and bottom arm respectively extending from the main body, wherein,
the housing-backpost is configured to receive the pin keeper from the distal end; and
the top and bottom arms are configured to hold respectively on a top side and a bottom side of the ferrule to retain the ferrule in the housing-backpost.

3. The multi-fiber push-on optical connector of claim 2, further comprising polarity-changing key slidably retained on a surface of the housing-backpost, the polarity-changing key including an aperture cooperating with a deformable housing-backpost projection to retain the polarity-changing key on the housing-backpost.

4. The multi-fiber push-on optical connector of claim 1, further comprising:
an outer housing at least partially surrounding the housing-backpost; and
one or more resilient forward biasing projections extending from one or more of the outer housing or the housing-backpost for biasing the outer housing towards a distal end of the housing-backpost.

5. The multi-fiber push-on optical connector of claim 4, wherein the one or more resilient forward biasing projections is integrally formed with either the housing-backpost or with the outer housing.

6. The multi-fiber push-on optical connector of claim 4, wherein the one or more resilient forward biasing projection is a primary bendable arm protruding from the outer housing.

7. The multi-fiber push-on optical connector of claim 6, further comprising one or more auxiliary bendable arms protruding from the outer housing and configured to act on the primary bendable arm to enhance the elastic force for biasing the outer housing towards the distal end of the housing-backpost.

8. The multi-fiber push-on optical connector of claim 4, wherein the one or more resilient forward biasing projection further comprises a bendable arm protruding from the housing-backpost.

9. The multi-fiber push-on optical connector of claim 4, wherein the one or more resilient forward biasing projection is a ramp extending from the housing-backpost.

10. The multi-fiber push-on optical connector of claim 9, further comprising a flexing wing in the outer housing configured to open upon contacting the ramp as the outer housing is withdrawn in the distal direction.

11. The multi push-on optical connector of claim 4, wherein the one or more resilient forward biasing projection is a flexing wedge formed on the housing-backpost.

12. The multi-fiber push-on optical connector of claim 11, wherein a proximal edge of the outer housing compresses the flexing wedge as the outer housing is withdrawn in a proximal direction.

* * * * *